United States Patent [19]
Dmytriw

[11] 3,949,513
[45] Apr. 13, 1976

[54] FISHING FLOAT
[76] Inventor: Walter Dmytriw, 65 Southport St., 404, Toronto, Ontario, Canada
[22] Filed: Nov. 5, 1974
[21] Appl. No.: 521,440

[52] U.S. Cl. .............................................. 43/44.93
[51] Int. Cl.² ........................................ A01K 93/00
[58] Field of Search............ 43/44.92, 44.93, 44.95, 43/44.87, 44.9, 42.49

[56] References Cited
UNITED STATES PATENTS

| 1,850,748 | 3/1932 | Foster................................ | 43/44.93 |
| 2,379,676 | 7/1945 | Blackstone........................ | 43/44.93 |
| 2,547,469 | 4/1951 | Husson.............................. | 43/42.49 |
| 3,337,981 | 8/1967 | Bowman............................ | 43/44.93 |

FOREIGN PATENTS OR APPLICATIONS

| 809,368 | 2/1959 | United Kingdom................ | 43/44.93 |

*Primary Examiner*—Warner H. Camp
*Attorney, Agent, or Firm*—Rogers, Bereskin & Parr

[57] ABSTRACT

A fishing float includes a buoyant float body and a fishing line attachment member adapted to be removably coupled to the body. The member is formed with a slit which is dimensioned to receive and frictionally retain a fishing line, and which is positioned so that the line is trapped between the float body and the member when they are coupled together.

4 Claims, 9 Drawing Figures

FISHING FLOAT

This invention relates to fishing floats.

In certain fishing techniques a float is attached to a fishing line so that, when the line is cast, the baited end portion of the line is suspended from the float with the bait clear of the bottom. It is important that the float is securely attached to the line so that the line cannot move relatively to the float, for example, when casting or when a fish pulls on the line. The method of attaching the float to a line depends on the type of float. For example, a spherical float may have two formations at diametrically opposed locations on its surface with which the line can be engaged, the line extending across said surface between the formations. In any event, it is normal to rely mainly on frictional engagement between the line and the float to prevent relative movement therebetween. As a result, it is found in practice that a conventional float may slip along a line to which it is attached. Fishermen tend to be reluctant to knot a fishing line to attach a float, in part because of the difficulty of undoing a knot in a wet line to remove the float when winding in the line.

An object of the present invention is to provide an improved fishing float.

According to the invention the float comprises a buoyant float body and a fishing line attachment member adapted to be removably coupled to the body. The said member is formed with a slit which is dimensioned to receive and frictionally retain a fishing line, and which is positioned so that the line is trapped between the float body and the member when they are coupled together.

The invention will be better understood by reference to the accompanying drawings, in which:-

Figure 1:
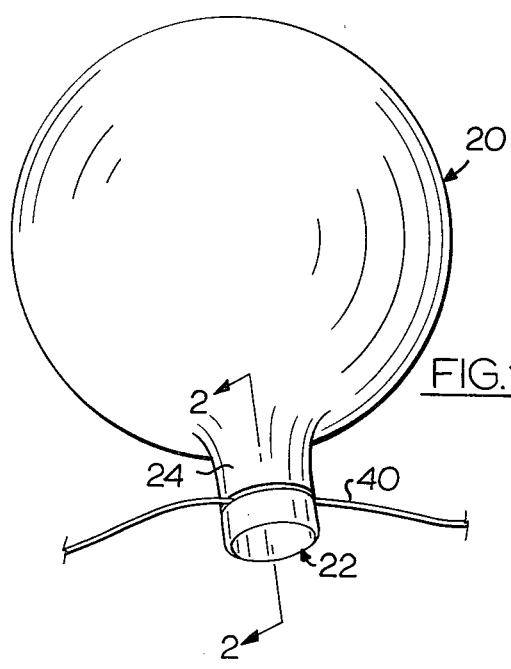
FIG. 1 is a perspective view of a fishing float according to one embodiment of the invention, having a fishing line attached thereto.

Reference will first be made to FIG. 1 which shows a fishing float comprising a buoyant float body 20 of spherical shape and a fishing line attachment member 22 which is removably coupled to the body 20. Body 20 is hollow and includes an integral "neck" portion 24 which defines an elongate opening 26 (FIG. 2) communicating with the interior of the body.

Member 22 is designed to be coupled with body 20 by way of the said opening 26 and includes a stopper portion 28 which fits inside the opening and a head portion 30 which is disposed externally of the neck 24 when the member 22 is fitted to the body 20. The stopper portion 28 of member 22 is of circular shape in cross-section and has a rounded inner end 32 to facilitate insertion of the member into the opening 26. A peripheral rib 34 of triangular shape in cross-section extends around the stopper portion 28 of member 22 at a position approximately half way along its length. A complementary triangular section groove 36 is provided inside the opening 26 of body 20 to receive rib 34. The body 20 is made of relatively rigid plastic material and the fishing line attachment member 22 is made of a resilient plastic material so that the rib 34 will distort as the member 22 is inserted into the opening 26, until the rib snaps into groove 36, whereby the member is retained inside the opening. The dimensions of the opening 26 and the stopper portion 28 are selected so that the stopper portion is a close, water-tight fit inside the opening.

Figure 2:
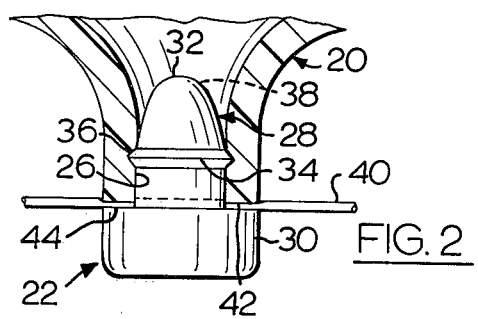
FIG. 2 is a sectional view on line 2—2 of FIG. 1.
Figure 3:
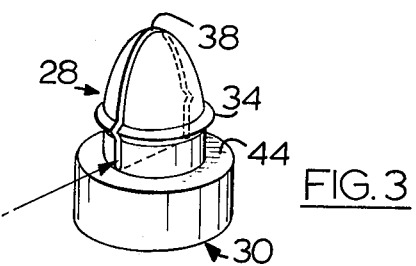
FIG. 3 is a perspective view of the fishing line attachment member of the float shown in FIG. 1.

The stopper portion 28 of member 22 is formed with a diametral slit 38 dimensioned to receive and frictionally retain a fishing line 40 to be attached to the float. As can be seen from FIG. 3, the slit 38 extends from the inner end 32 of the stopper portion 28 to a position level with the upper face of the head portion 30 of the member. Accordingly, with the member 22 positioned as shown in FIG. 3, a fishing line 40 is engaged in the upper end of slit 38 and then drawn down the slit to the position in which it is shown in FIG. 2.

In use, the member 22 is force-fitted into the opening 26 in neck 24. Due to the resilient nature of the material from which the member is made, the action of fitting it into the opening will radially compress the stopper portion 28, tending to close up the slit 38 and further grip the line. Further, since the slit 38 extends down the stopper portion 28 from its inner end to the level of the head portion 30 of the member, the line is also trapped between the outer end 42 of the neck 24 and the upper face 44 of the head portion 30 of the attachment member.

The head portion 30 of the member 22 is slightly larger in diameter than the neck 24 of body 20 so that the member can be readily gripped when it is to be removed from the neck 24. Removal is effected by twisting the member and pulling it axially outwards.

Figure 4:
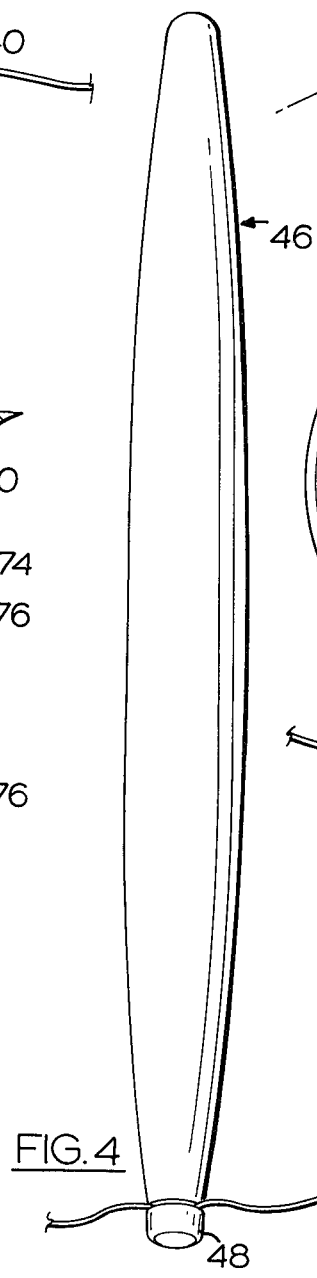
FIG. 4 is a perspective view of a differently-shaped fishing float according to the invention.

FIG. 4 shows a float according to the invention, in which the buoyant float body (denoted 46) is of elongate "sausage" shape. The body is hollow and is fitted with a fishing line attachment member denoted 48. The body 46 is formed at one end with an opening into which the attachment member 48 is fitted. The opening in the body 46 and the attachment member 48 are similar to the corresponding parts of the float shown in FIGS. 1 to 3 and are not therefore illustrated in detail.

Figure 5:
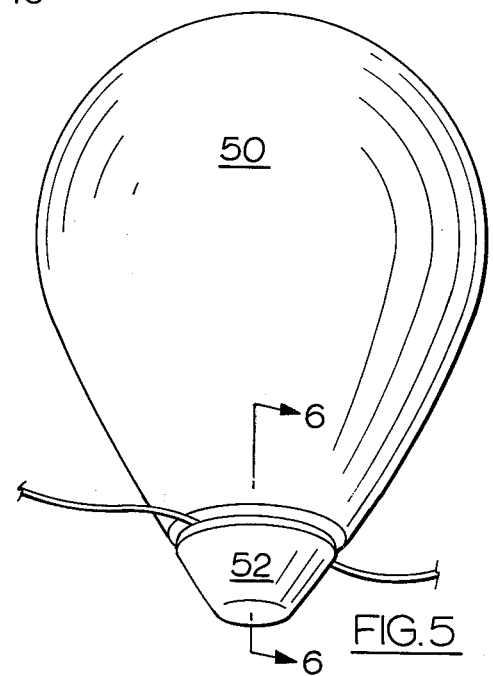
FIG. 5 is a perspective view of a further, differently-shaped fishing float according to the invention.
Figure 6:
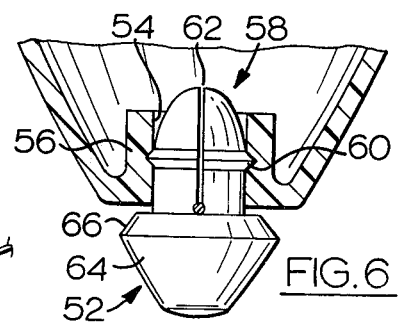
FIG. 6 is a sectional view on line 6—6 of FIG. 5.

FIGS. 5 and 6 show another float according to the invention, in which the float body (denoted 50) is generally pear-shaped. The fishing line attachment member is generally denoted 52 and is similar to the member 22 shown in FIGS. 1 to 3. Member 52 fits inside an opening 54 in the body 50. In this case the opening is defined by an internal annular sleeve 56 at the bottom end of body 50, rather than by an external neck as in the float shown in FIGS. 1 to 3. The fishing line attachment member includes a stopper portion 58 which fits inside the opening 54. Portion 58 is similar to the stopper portion 28 of member 22 in that it includes a peripheral rib 60 and a diametral slit 62. The form of the stopper portion will not therefore be described in detail.

The member 52 also includes a head portion 64 which in this case is domed and is shaped to conform to and merge with the profile of the body so that the float as a whole has a pear-shaped appearance. An undercut bevel 66 is provided around the inner end of the head portion 64 of member 52 so that a person wishing to remove the member 52 can insert his or her fingers between the head portion 64 of member 52 and the body 50 to pry the member away from the body.

Figure 7:
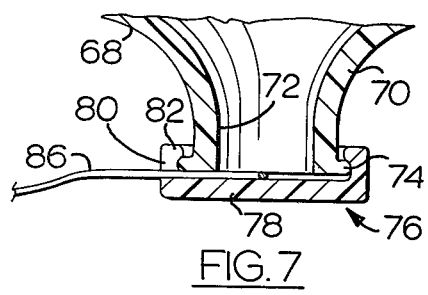
FIG. 7 is a view similar to FIGS. 2 and 6 illustrating an alternative embodiment of the invention.
Figure 8:
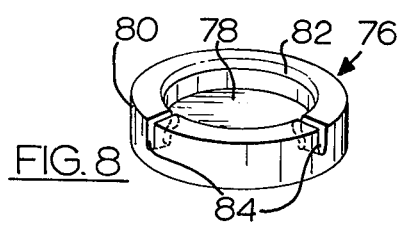
FIG. 8 is a perspective view of the fishing line attachment member shown in FIG. 7.

Reference will now be made to FIGS. 7 and 8 which show an alternative embodiment of the invention. In this case, the float body, part of which is visible at 68 in FIG. 7, is formed with a neck 70 which defines an opening 72 having a plain inside surface. A flange 74 is formed around the outer end of the neck 70. The fishing line attachment member is denoted 76 and is in the form of a plastic snap-on cap. Member 76 includes a top portion 78 having an upstanding peripheral wall 80 formed with a thickened, inwardly-directed rim 82 at its upper end. When the member 76 is fitted to the neck 70, the rim 82 snaps over the flange 74 on the neck 70. Two slits 84 are formed in the wall 80 of member 76 to frictionally engage a fishing line. The slits are positioned on lines which extend radially of the top 78 of the cap approximately at right angles with respect to one another.

In use, a fishing line 86 to be attached to the float is laid in the slits 84 when the member 76 is positioned as shown in FIG. 8. It will be noted that the slits 84 terminate level with the upper surface of the top 78 of member 76 so that when the member is fitted to the neck 70 of the float body, the line 86 is trapped between the top 78 of member 76 and the outer edge of the neck 70. The slits 84 are dimensioned to frictionally engage the line 86. Further, the fact that the line extends on an angled path through the member further reduces the likelihood of the line being pulled through the cap.

Figure 9:
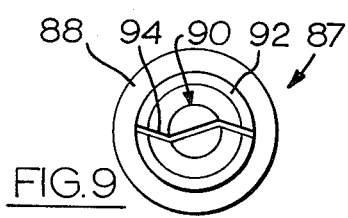
FIG. 9 is a plan view of a modified stopper-type fishing line attachment member.

FIG. 9 shows a modified stopper-type fishing line attachment member which may be used in any of the embodiments described with reference to FIGS. 1 to 6. In FIG. 9 the member is denoted 87 and includes a cylindrical head portion 88, and a stopper portion 90 which has a rounded inner end and is provided with a peripheral rib 92. A slit 94 is formed in the stopper portion 90 and extends from its outer end to a position level with the upper face of the head portion 88. In contrast to the previously-described embodiments, the slit 94 is of zig-zag shape in plan view in order to provide further resistance to movement of the line through the slit.

It is to be understood that the preceding description applies to specific embodiments of the invention and that many modifications are possible within the broad scope of the invention.

For example, although three specific shapes of float body have been shown in the drawings, it is to be understood that the body may be of any shape.

According to another modification of the invention, a stopper form fishing line attachment member could be simply force fitted into a plain aperture in a float body. In the case of a hollow float body, a simple aperture in the body wall may be provided to receive the attachment member. The member may be provided with a peripheral rib to pass through the aperture and engage the inside surface of the float body wall. In another embodiment, a fishing line attachment member (whether of stopper form or cap form) may be coupled to a float body by complementary screw threads on the member and body.

Further, it should be noted that the float body is not necessarily hollow. For example, a solid cork float body could be used. A solid float body could be formed with an opening to receive a stopper-form fishing line attachment member. Alternatively, such a body may have a formation defining a flange into which an attachment member in the form of a cap may be fitted.

In each of the specific embodiments described above, the float body is of a relatively rigid plastic material and the fishing line attachment member is made of a resilient plastic material. It is, however, to be understood that both components could be resilient or the float body could be resilient and the attachment member relatively rigid. Further, materials other than plastics may be used, for example, rubber.

Finally, it should be noted that the shape of the slit or slits in the fishing line attachment member may vary. For example, in the case of a stopper-form element as shown in FIGS. 2 and 3, the slit could be angled about the axis of the stopper-portion, and in the FIG. 9 embodiment the slot may follow a different zig-zag path. In the embodiment of FIGS. 7 and 8, the slits 84 may be differently arranged; for example, they may be positioned in alignment with one another on a diameter of the top 78 of the member.

What I claim is:

1. A fishing float comprising:
   a buoyant float body formed with an opening; and,
   a fishing line attachment member which extends about a longitudinal axis, and which includes: a first portion adapted to be fitted into said opening in the float body to couple the member and the body and close said opening; and, a second portion disposed axially adjacent said first portion and arranged to protrude from the body when the member and body are coupled together, so that the second portion can be gripped for the purpose of separating the member and the body;
   said first portion of the member being formed with a peripheral rib, and the portion of the float body defining said opening being formed with a complimentary groove to receive the rib and retain the first portion in the opening in the float body in use, at least one of the body and the member being resiliently deformable to permit the rib to engage in and disengage from the groove;
   said first portion of the member also being formed with a slit which is disposed parallel to said axis of the member and is dimensioned to receive and frictionally retain a fishing line, the slit opening into the end of the member remote from said second portion and extending from said end substantially to the position of said second portion;
   said second portion of the member being of greater diameter than the first portion and defining around said first portion an inner face positioned to engage a fishing line frictionally retained in said slit so that the line is trapped between the float body and said inner face when the fishing line attachment member and float body are coupled together in use.

2. A fishing float as claimed in claim 1, wherein the float body is hollow and is formed with a protuberant neck which defines the said opening.

3. A fishing float as claimed in claim 1, wherein the float body is hollow and is provided with an internal sleeve which communicates at its outer end with an aperture in the surface of said body and which defines the said opening.

4. A fishing float as claimed in claim 1, wherein the said slit is of zig-zag shape in plan.

* * * * *